United States Patent
Kim et al.

(10) Patent No.: US 7,933,187 B2
(45) Date of Patent: Apr. 26, 2011

(54) METHOD FOR DETECTING PATTERN OF OVER-SAMPLING IMAGE AND AN OPTICAL INFORMATION PROCESSING APPARATUS AND METHOD USING THE SAME

(75) Inventors: Nak Young Kim, Seoul (KR); Pil Sang Yoon, Seoul (KR); Kyu Il Jung, Seoul (KR)

(73) Assignee: DaeWoo Electronics Ltd. (KR)

( * ) Notice: Subject to any disclaimer, the term of this patent is extended or adjusted under 35 U.S.C. 154(b) by 359 days.

(21) Appl. No.: 12/344,929

(22) Filed: Dec. 29, 2008

(65) Prior Publication Data

US 2009/0168630 A1 Jul. 2, 2009

(30) Foreign Application Priority Data

Dec. 27, 2007 (KR) .................. 10-2007-0139331

(51) Int. Cl.
 *G11B 7/0065* (2006.01)
(52) U.S. Cl. ....................................... 369/103
(58) Field of Classification Search .............. None
See application file for complete search history.

(56) References Cited

U.S. PATENT DOCUMENTS

| | | | | |
|---|---|---|---|---|
| 5,511,058 A * | 4/1996 | Visel et al. | ...... | 369/103 |
| 7,411,708 B2 * | 8/2008 | Waldman et al. | ...... | 359/29 |
| 7,738,341 B2 * | 6/2010 | Hara et al. | ...... | 369/103 |
| 7,764,584 B2 * | 7/2010 | Hara et al. | ...... | 369/103 |
| 7,826,325 B2 * | 11/2010 | Tokuyama | ...... | 369/103 |
| 7,830,572 B2 * | 11/2010 | Szarvas et al. | ...... | 359/11 |
| 7,848,595 B2 * | 12/2010 | Ayres et al. | ...... | 382/294 |
| 2005/0226528 A1 | 10/2005 | Kang | | |
| 2005/0286388 A1 * | 12/2005 | Ayres et al. | ...... | 369/103 |
| 2008/0267040 A1 * | 10/2008 | Iida et al. | ...... | 369/103 |
| 2008/0310281 A1 * | 12/2008 | Hara et al. | ...... | 369/103 |
| 2009/0168630 A1 * | 7/2009 | Kim et al. | ...... | 369/103 |
| 2009/0238060 A1 * | 9/2009 | Yasuda et al. | ...... | 369/103 |
| 2010/0061213 A1 * | 3/2010 | Crompvoets et al. | ...... | 369/103 |

FOREIGN PATENT DOCUMENTS

| | | |
|---|---|---|
| JP | 2007-171910A A | 5/2007 |
| KR | 10-2005-0107707A A | 11/2005 |
| KR | 10-2007-0066377A A | 6/2007 |
| WO | PCT/KR2008/007612 | 12/2008 |

\* cited by examiner

*Primary Examiner* — Peter Vincent Agustin

(57) ABSTRACT

Provided are a method for detecting a pattern of an over-sampling image and an optical information processing apparatus and method using the same. A method for detecting a pattern from an image of an over-sampled datapage includes: over-sampling the datapage to detect a detection image of the datapage; comparing the detection image and a reference image of over-sampling for the pattern by a covariance; and calculating a pixel of the pattern over-sampled by values of the reference image and the detection image compared by the covariance. Accordingly, data with a specific pattern such as a mark can be detected from an image of an over-sampled datapage, thereby making it possible to increase the data reproduction accuracy, thus making it possible to greatly increase the reliability of reproduced optical data.

17 Claims, 7 Drawing Sheets

FIG. 7

METHOD FOR DETECTING PATTERN OF OVER-SAMPLING IMAGE AND AN OPTICAL INFORMATION PROCESSING APPARATUS AND METHOD USING THE SAME

CROSS-REFERENCE TO RELATED APPLICATION

This application claims the benefit of Korean Patent Application No. 10-2007-0139331, filed Dec. 27, 2007, the disclosure of which is hereby incorporated herein by reference in its entirety.

BACKGROUND OF THE INVENTION

1. Field of the Invention

The present invention relates to optical information processing, and more particularly, to a method for detecting a pattern of an over-sampling image and an optical information processing apparatus and method using the same, which can detect a specific pattern such as a mark from an image of a datapage detected using a covariance.

2. Description of the Related Art

Examples of optical information processing apparatuses include compact discs (CDs), digital versatile discs (DVDs), high-definition DVDs (HD-DVDs), blue-ray discs (BDs), and near-field optical processing apparatuses. With a recent increase in demand for a next-generation storage system with a large storage capacity, attentions are focused on a holographic optical information processing apparatus.

For recording of optical information in a holographic optical information processing apparatus, a recording reference beam and an information beam carrying image information of original data are irradiated onto an optical information recording medium in an overlapping manner and the resulting interference pattern is recorded on the optical information recording medium.

For reproduction of the recorded optical information, a reproducing reference beam is irradiated onto the optical information recording medium and a reproducing beam is generated by diffraction of the reproducing reference beam by the interference pattern. If the recording reference beam is identical to the reproducing reference beam, the generated reproducing beam carries optical information identical to the optical information carried in the information beam in the recording operation.

The holographic optical information processing apparatus processes digital data on a page-by-page basis, and such page-based data is generally called a datapage. That is, the holographic optical information processing apparatus processes information on a datapage-by-datapage basis.

An image of a datapage reproduced from the reproducing beam is detected by a light-receiving array device such as a complementary metal-oxide semiconductor (CMOS) device or a charge-coupled device (CCD). The detected image of the datapage is restored to the original data through a series of demodulating and decoding processes.

Also, in general, the datapage is generated by various over-sampling methods such as a 1:3 over-sampling method, a 1:2 over-sampling method, and 1:1.5 over-sampling method.

The over-sampling method detects an image of a datapage using detection pixels more than data pixels at a given ratio, and samples suitable data from the over-sampling detection image.

For example, the 1:3 over-sampling method detects an image of a datapage by constructing an optical system such that nine (3×3) detection pixels correspond to one data pixel, and samples values of the detection pixels on the over-sampling detection image through a suitable sampling process.

Herein, the sampling process may be any sampling process such as a sampling process of sampling each of only values of detection pixels detecting an image of the most accurate data pixel on the detection image, or a sampling process of adding values of nine detection pixels corresponding to the respective data pixels and averages the results to perform a sampling operation.

The datapage recorded by the above mapping method includes a data region with data information and a mark disposed to detect the position and range of the data region. Herein, the mark has a specific pattern in which a plurality of on-pixels and off-pixels are arranged in consecutively or inconsecutively.

In reproducing the data, a portion corresponding to the mark on the detected image of the datapage is first detected and a detection portion of the data region within a predetermined range from the position is detected to sample a data value. That is, the frame mark serves as an identifier for detecting the sampling position.

However, in reproducing the image of the datapage, because the position of a reproducing image formed in a light-receiving array device changes due to the shrinkage or rotation of an optical information storage medium, a misalignment occurs, thus causing a mismatch between a pixel of the datapage image (hereinafter simply referred to as a pixel) and a pixel of the light-receiving array device (hereinafter simply referred to as a detection pixel).

The present invention provides a method for detecting a pattern of an over-sampling image and an optical information processing apparatus and method using the same, which can detect a specific pattern such as a mark from an image of a datapage detected using a covariance.

SUMMARY OF THE INVENTION

According to an aspect of the present invention, a method for detecting a pattern from an image of an over-sampled datapage includes: over-sampling the datapage to detect a detection image of the datapage; comparing the detection image and a reference image of over-sampling for the pattern by a covariance; and calculating a pixel of the pattern over-sampled by values of the reference image and the detection image compared by the covariance.

According to another aspect of the present invention, an optical information processing method for detecting an image of a datapage by over-sampling the datapage includes: over-sampling the datapage to detect a detection image of the datapage; detecting a mark of the detection image from the detection image by using a covariance; demodulating the detection image on the basis of the detected mark; and decoding the demodulated detection image to generate output data.

According to another aspect of the present invention, an optical information processing apparatus includes: a light source; a beam splitter for splitting a beam emitted from the light source into a reference beam and a signal beam; a spatial light modulator for loading data into the signal beam; an input data processing unit for encoding the data, modulating the encoded data by modulation code conversion to generate a datapage carrying a mark, and providing the generated datapage to the spatial light modulator; a detector for over-sampling and detecting the datapage from a reproducing beam reproduced in a recording medium by the reference beam; and an output data processing unit for comparing and calculating a mark of the datapage image detected by the detector and the reference image for the mark by a covariance, and generating output data by demodulating and decoding the detection image using the mark as a reference position.

According to another aspect of the present invention, an optical information processing apparatus includes: a light source for emitting a beam for reproduction of a datapage; a detector for over-sampling and detecting the datapage from a reproducing beam reproduced in a recording medium by the beam; and an output data processing unit for comparing and calculating a mark of the datapage image detected by the detector and the reference image for the mark by a covariance, and generating output data by demodulating and decoding the detection image using the mark as a reference position.

According to the present invention, the method for detecting a pattern of an over-sampling image and the optical information processing apparatus and method using the same can detect data with a specific pattern such as a mark from an image of an over-sampled datapage, thereby making it possible to increase the data reproduction accuracy, thus making it possible to greatly increase the reliability of reproduced optical data.

BRIEF DESCRIPTION OF THE DRAWINGS

FIG. 7 is a diagram illustrating an example of an over-sampling detection image of the mark contained in the datapage in the optical information processing apparatus according to the present invention.

DETAILED DESCRIPTION OF THE INVENTION

Hereinafter, a method for detecting a pattern of an over-sampling image and an optical information processing apparatus and method using the same according to the present invention will be described in detail with reference to the attached drawings.

In describing the present invention, the terms of respective components are defined in consideration of the functions of the present invention. The defined terms should not be construed as limiting the technical components of the present invention, and may be defined as other terms in the related art. Also, reference symbols assigned to respective components are used for the purpose of convenience in the description, and the illustrations on the drawings assigned the reference symbols do not limit the respective components within the drawings. Also, if the respective components are functionally similar or identical to those in modified embodiments and embodiments modifying some structures on the drawings, they should be considered as equivalent structures.

First, an optical information processing apparatus using a method for detecting a pattern of an over-sampling image according to the present invention will be described with reference to the attached drawings.

Figure 1:
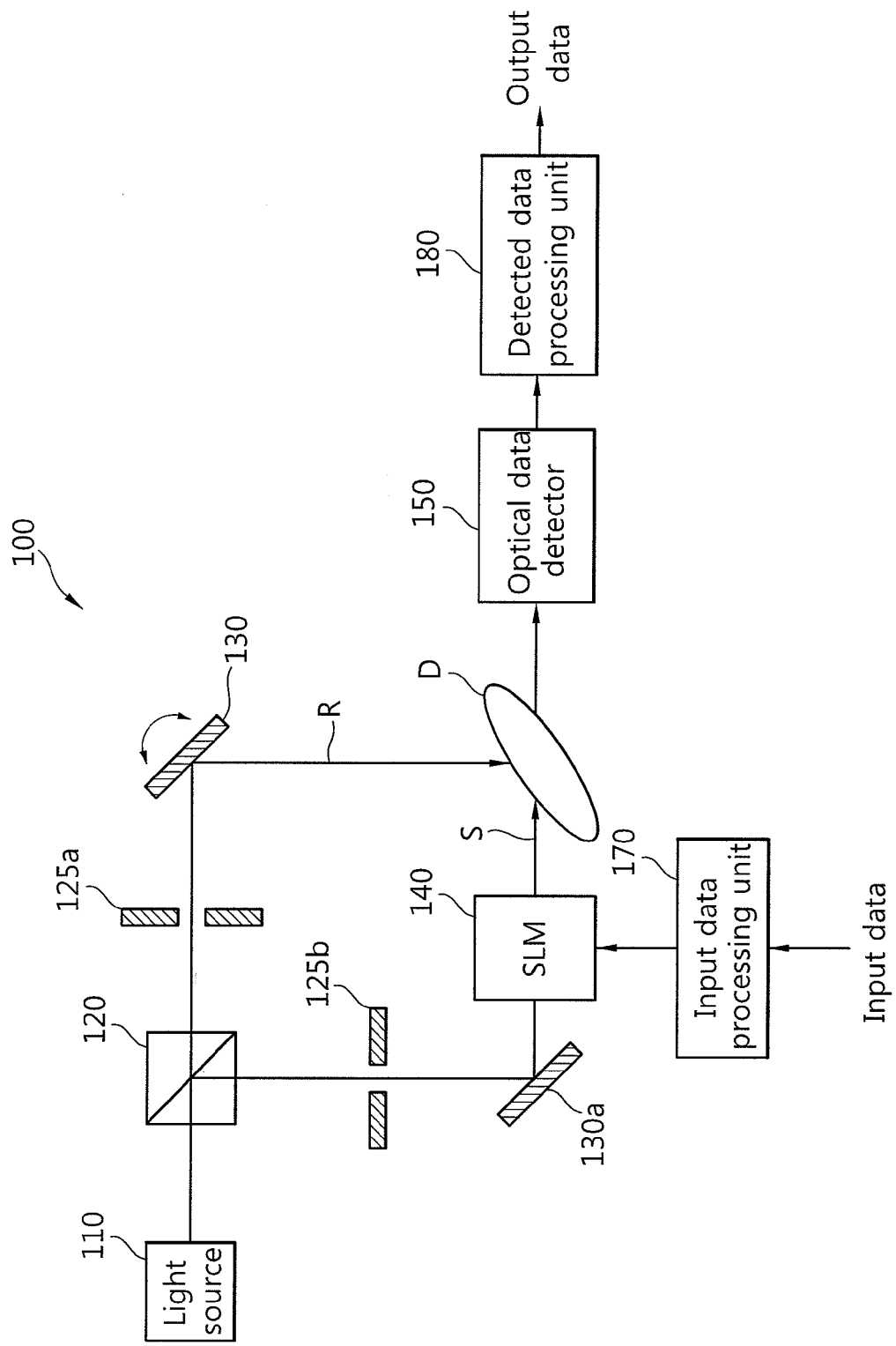
FIG. 1 is a block diagram of an optical information processing apparatus according to the present invention.

FIG. 1 is a block diagram of an optical information processing apparatus according to the present invention.

Referring to FIG. 1, an optical information processing apparatus 100 according to the present invention includes a light source 110, a beam splitter 120, a multiplexer 130, a spatial light modulator (SLM) 140, an optical information detector 150, an input data processing unit 170, and an output data processing unit 180.

A beam emitted from the light source 110 is split into a reference beam R and a signal beam S by the beam splitter 120. The reference beam R passes through a first shutter 125*a*, is reflected by the multiplexer 130, and is incident on an optical information recording medium D at a predetermined angle.

The signal beam S passes through a second shutter 125*b*, is reflected by a reflecting mirror 130*a*, and is incident on the spatial light modulator 140. At this point, a datapage provided by the input data processing unit 170 is input to the spatial light modulator 140.

The input data processing unit 170 converts input data into datapage information (i.e., a data unit of binary data) by encoding and modulation code conversion and provides the datapage information to the spatial light modulator 140.

The spatial light modulator 140 optically modulates the datapage information input from the input data processing unit 170 to generate a datapage of a two-dimensional image, loads the datapage into the incident signal beam S, and irradiates the signal beam S to the recording medium D.

When the reference beam R and the signal beam S are irradiated to the recording medium D, an interference pattern generated by the interference between the reference beam R and the signal beam S (i.e., light induced generation of mobile charge) is recorded in the recording medium D.

The multiplexer 130 performs an angular multiplexing operation by adjusting an angle at which the reference beam R is incident on the recording medium D. The multiplexer 130 may be a rotating mirror such as a galvano mirror.

At the time of reproducing recorded data, only the reference beam R is irradiated to the recording medium D. The first shutter 125*a* transmits the reference beam R split by the beam splitter 120 and the second shutter 125*b* blocks the signal beam S.

At this time, the reference beam R is diffracted by the interference pattern recorded in the recording medium D to generate a reproducing beam carrying an image of a datapage. The reproducing beam is detected in the image of the data page by the optical information detector 150. The detected image of the datapage is converted into output data by the output data processing unit 180.

The optical information detector 150 may include a light-receiving array device such as a CMOS device and a CCD. The output data processing unit 180 performs demodulation code conversion and decoding on the datapage detected in image by the optical information detector 150, to output the final output data.

Hereinafter, a description will be given of the modulation of optical information by the input data processing unit 170.

Figure 2:
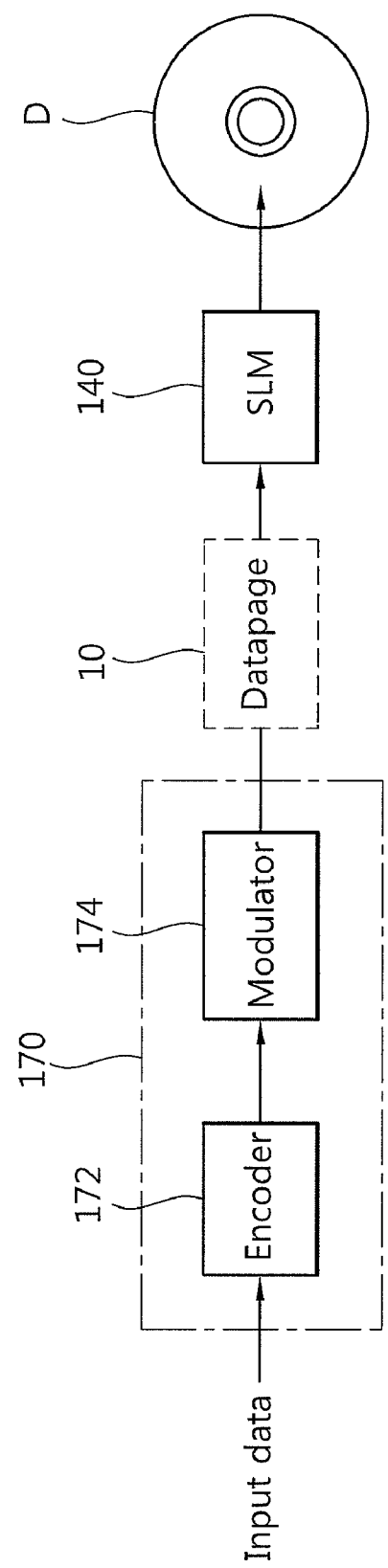
FIG. 2 is a block diagram illustrating the modulation of optical information by the optical information processing apparatus according to the present invention.

FIG. 2 is a block diagram illustrating the modulation of optical information by the optical information processing apparatus according to the present invention.

Referring to FIG. 2, the input data processing unit 170 generates a datapage by encoding and modulation code conversion.

The input data processing unit 170 includes an encoder 172 and a modulator 174. The encoder 172 performs an encoding operation using input data. The demodulator 174 demodulates a code, generated by the encoder 172, based on modulation code conversion.

When optical information data are input to the input data processing unit 170, a code corresponding to the data is generated by the encoder 172 and the generated code is modulated by the modulator 174 to generate a datapage.

The datapage, generated by the modulation based on modulation code conversion, is loaded into the signal beam S by the spatial light modulator 140. The signal beam S loaded with optical information is irradiated to the optical information recording medium D, and the optical information is recorded by an interference with the reference beam R.

Figure 3:
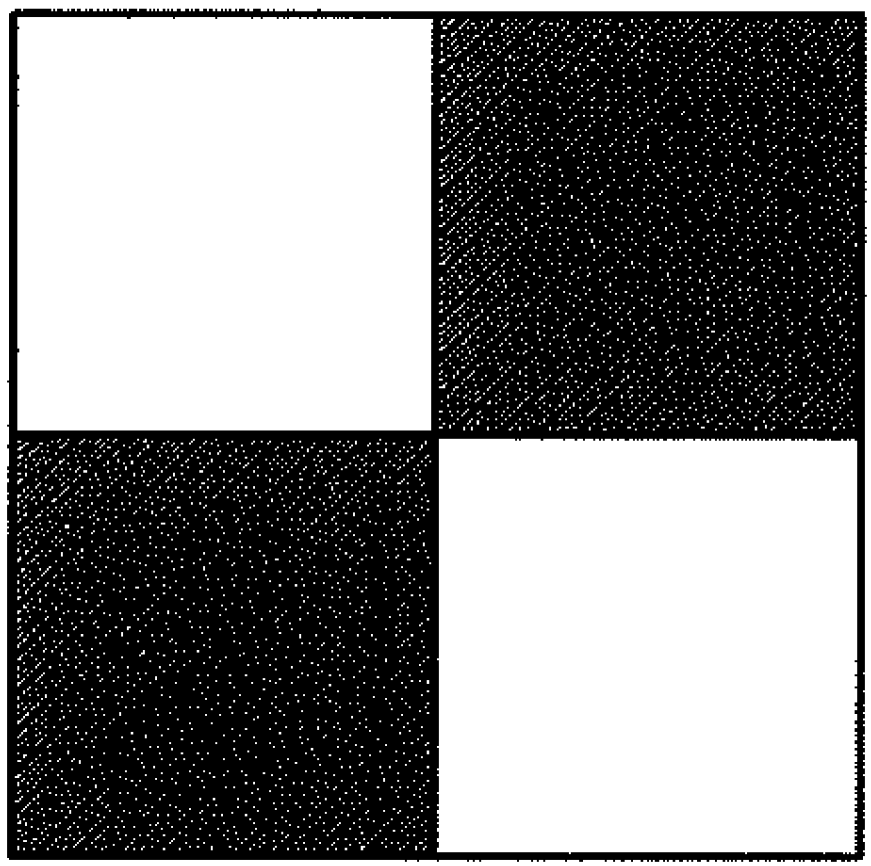
FIG. 3 is a diagram illustrating an example of a mark contained in a datapage in the optical information processing apparatus according to the present invention.

As illustrated in FIG. 3, a mark, which is formed by a specific pattern for detection of the position and range of a data region constituting a data page, is disposed at a specific position in the datapage generated by the modulator 174.

The present invention is characterized not by the position and pattern of the mark but by the detection of an over-sampled mark, and thus a detailed description of the mark will be omitted for conciseness. Also, the present invention is not limited by a pattern of a mark illustrated in FIG. 3 and a pattern of a mark exemplified hereinafter.

The demodulation of optical information by the optical information processing apparatus according to the present invention is performed by the output data processing unit 180 of the optical information processing apparatus.

Hereinafter, a description will be given of the iterative demodulation of optical information by the output data processing unit 180.

Figure 4:
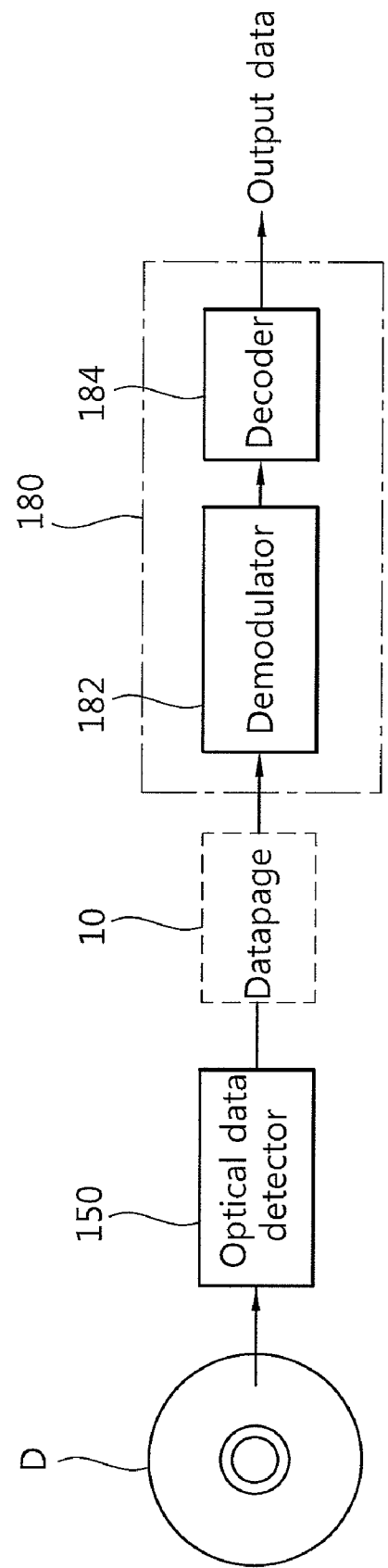
FIG. 4 is a block diagram illustrating the demodulation of optical information by the optical information processing apparatus according to the present invention.
Figure 5:
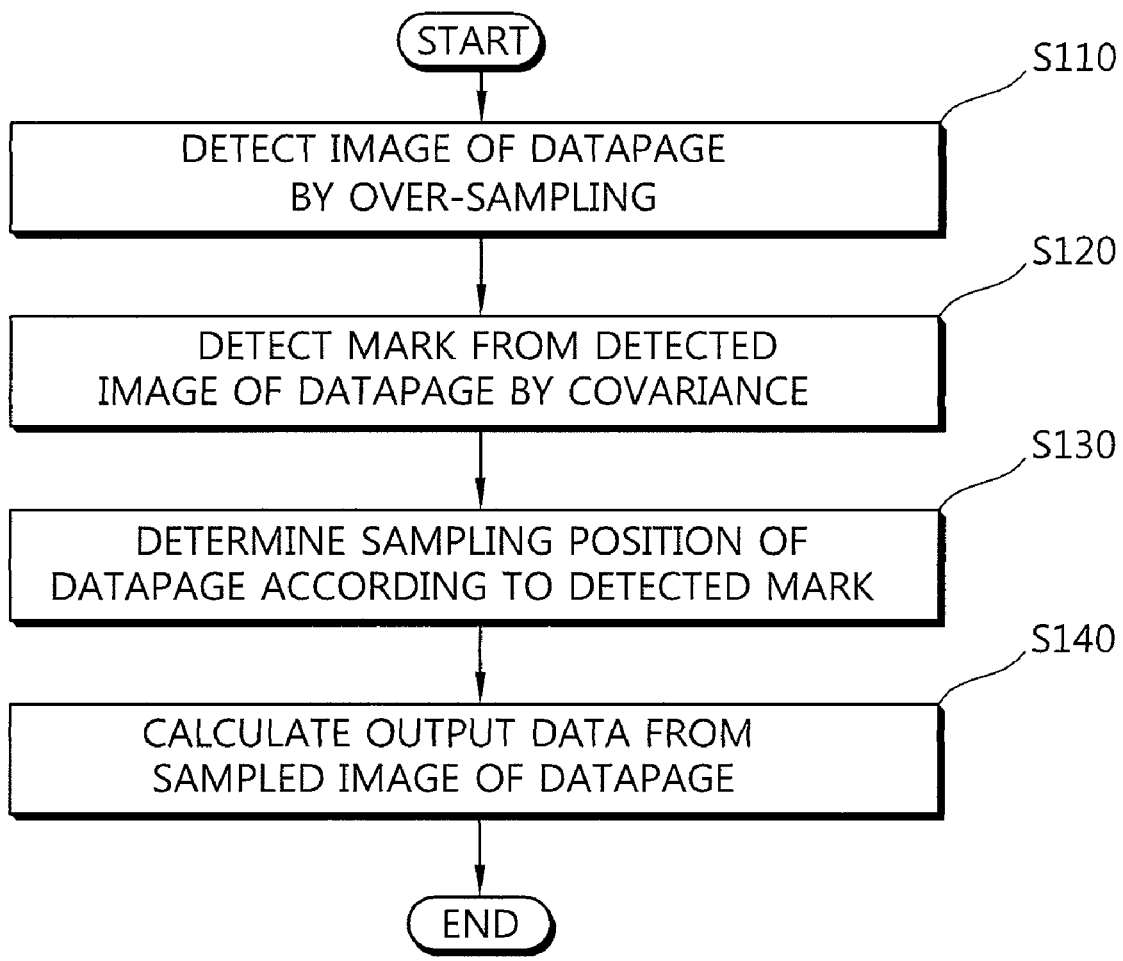
FIG. 5 is a flow chart illustrating the correction of a detected image in the optical information demodulation by the optical information processing apparatus according to the present invention.

FIG. 4 is a block diagram illustrating the demodulation of optical information by the optical information processing apparatus according to the present invention. FIG. 5 is a flow chart illustrating the correction of a detected image in the optical information demodulation by the optical information processing apparatus according to the present invention.

Referring to FIGS. 4 and 5, optical information stored in the recording medium D is detected by the optical information detector 150 (in step S110). Herein, a datapage of the optical information detected is over-sampled by various over-sampling methods as described in the related art.

The following embodiment exemplifies a datapage detected by a 1:3 over-sampling method, to which the present invention is not limited.

The output data processing unit 180 includes a demodulator 182 and a decoder 184.

The demodulator 182 demodulates a datapage by modulation code conversion of an image of a datapage read by the optical information detector 150. Herein, the demodulator 182 uses a covariance to detect a mark contained in the datapage, and then performs the demodulation operation (in step S120).

The demodulator 182 determines a sampling position for the image of the datapage according to the position of the mark calculated using the covariance (in step S130).

The decoder 184 performs a decoding operation through an image of the datapage sampled by the demodulator 182, and performs an integrity check on the decoded data by parity check to generate output data (in step S140).

Hereinafter, a description will be given of the detection of the mark contained in the image of the datapage by the covariance.

Figure 6:
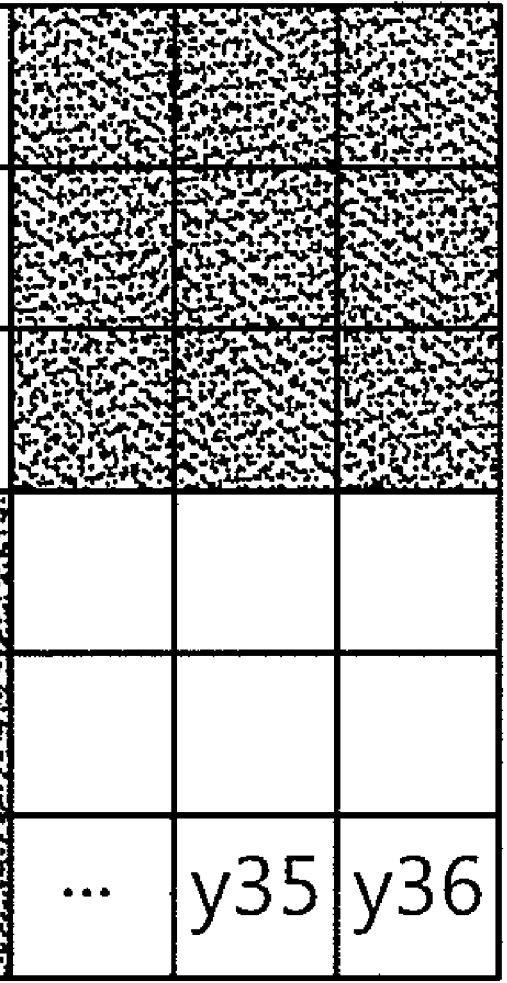
FIG. 6 is a diagram illustrating an example of an over-sampling reference image of the mark contained in the datapage in the optical information processing apparatus according to the present invention.
Figure 7:
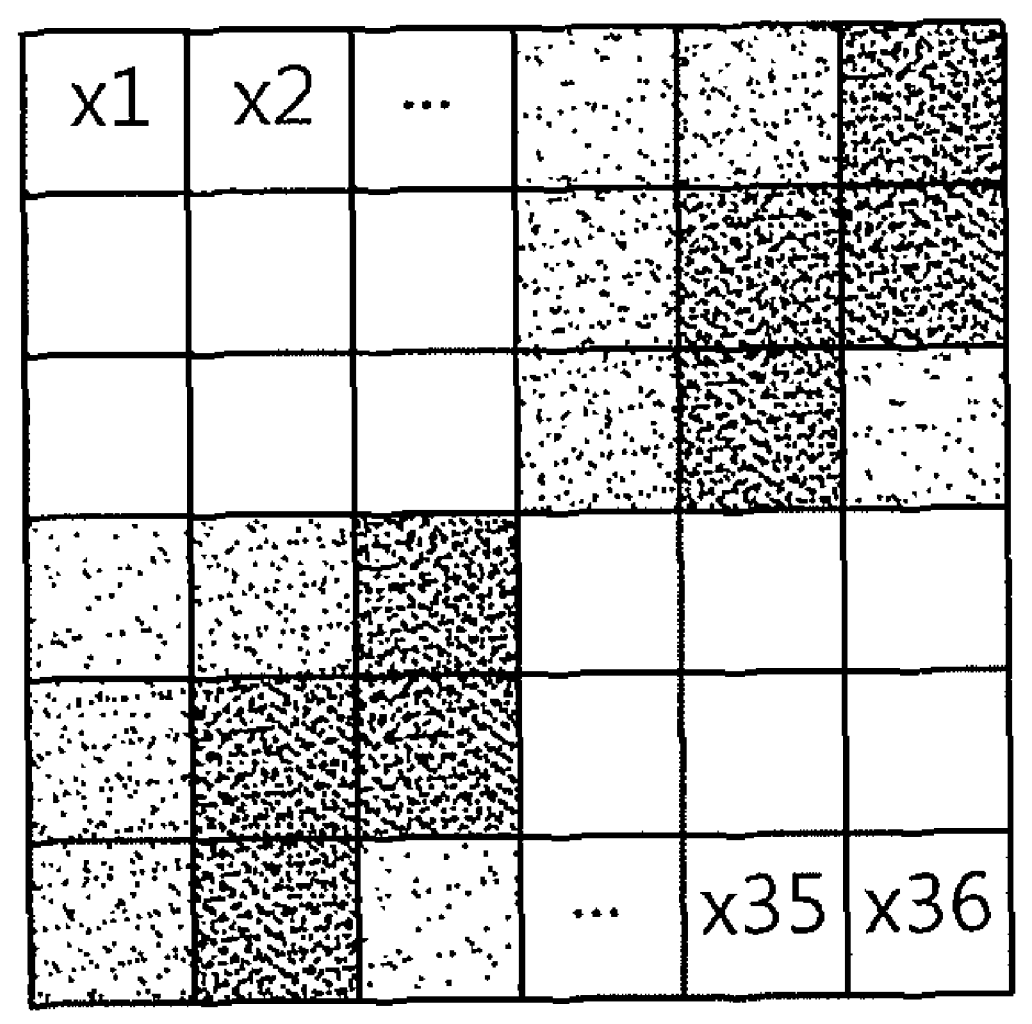

FIG. 6 is a diagram illustrating an example of an over-sampling reference image of the mark contained in the datapage in the optical information processing apparatus according to the present invention. FIG. 7 is a diagram illustrating an example of an over-sampling detection image of the mark contained in the datapage in the optical information processing apparatus according to the present invention.

First, the demodulator 182 has a reference image contained in a datapage, and an example of the reference image is illustrated in FIG. 6. An example of a detection image of a mark detected by the optical information detector is illustrated in FIG. 7.

Herein, the demodulator compares the reference image of the mark and the detection image of the mark by a covariance to detect an accurate pixel containing the mark.

The comparison of the reference image and the detection image may be performed as Equation (1).

$$C = \sum_{i}(x_i - m_x)(y_i - m_y) \quad (1)$$

where $x_i$ denotes a pixel value of the detection image, $m_x$ denotes a mean value of $x_i$, $y_i$ denotes a pixel value of the reference image, and $m_y$ denotes a mean value of $y_i$.

That is, the pixel values of the reference image and the detection image of the mark are compared with each other, a pixel with the largest is calculated, and a pattern of the mark is detected on the basis of the calculated pixel.

Also, in order to increase the accuracy in the calculation of Equation (1), the reference image and the detection image may be compared giving weight to a center pixel among a plurality of pixels corresponding to a mark image of a datapage in the 1:3 over-sampling, which may be performed as Equation (2).

$$C = \sum_{i}(x_i - m_x)(y_i - m_y) + \sum_{i=8,11,26,29}(x_i - m_x)(y_i - m_y) \quad (2)$$

where $x_i$ denotes a pixel value of the detection image, $m_x$ denotes a mean value of $x_i$, $y_i$ denotes a pixel value of the reference image, $m_y$ denotes a mean value of $y_i$, and i=8, 11, 16, 29 denotes a center pixel in a 3×3 pixel corresponding to a pixel of one mark of a datapage on the assumption that a mark of the datapage is 1:3 over-sampled.

A pixel of one mark of the datapage and a center pixel in a pixel corresponding to an image of the detected datapage are added and a difference of the value compared in the covariance is generated, thereby making it possible to calculate a more accurate mark position.

Also, as Equation (3), random integers may be used to amplify a value of each pixel detected in Equation (2), thus providing an easy covariance comparison.

$$C = k_1 \sum_{i}(x_i - m_x)(y_i - m_y) + k_2 \sum_{i=8,11,26,29}(x_i - m_x)(y_i - m_y) \quad (3)$$

where $x_i$ denotes a pixel value of the detection image, $m_x$ denotes a mean value of $x_i$, $y_i$ denotes a pixel value of the reference image, $m_y$ denotes a mean value of $y_i$, i=8, 11, 16, 29 denotes a center pixel in a 3×3 pixel corresponding to a pixel of one mark of a datapage on the assumption that a mark of the datapage is 1:3 over-sampled, and $k_1$ and $k_2$ are real numbers greater than 0.

Accordingly, the distribution values of the respective pixels constitution the detection value and the reference image of the mark contained in the datapage are compared by the covariance, thereby making it possible to detect the accurate position of the mark in the image of the over-sampled datapage.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, future modifications to the embodiments of the present invention cannot depart from the technical scope of the present invention.

What is claimed is:

1. A method for detecting a pattern from an image of an over-sampled datapage, comprising:
    detecting a detection image of the datapage by over-sampling the datapage;
    comparing the detection image with a reference image by a covariance, the reference image is an image of over-sampling for the pattern by a covariance; and,
    calculating a pixel of the pattern over-sampled by values of the reference image and the detection image compared by the covariance.

2. The method of claim 1, wherein a step of comparing the detection image with the reference image performs the covariance on the basis of a center pixel of the detection image detected with respect to the over-sampling reference image for the pattern.

3. The method of claim 1, wherein the value of the reference image and the detection image compared by the covariance is calculated by the following equation;

$$C = \sum_i (x_i - m_x)(y_i - m_y) + \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, and $i=z$ denotes a center pixel of the image of the datapage among the over-sampled pixels of the detection image.

4. The method of claim 1, wherein the value of the reference image and the detection image compared by the covariance is calculated by the following equation;

$$C = k_1 \sum_i (x_i - m_x)(y_i - m_y) + k_2 \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, $k_1$ and $k_2$ are real numbers greater than 0 to amplify the calculation values of the reference image and the detection image, and $i=z$ denotes a center pixel of the image of the datapage among the over-sampled pixels of the detection image.

5. An optical information processing method for detecting an image of a datapage by over-sampling the datapage, comprising:
    detecting a detection image of the datapage by over-sampling the datapage,
    detecting a mark of the detection image from the detection image by using a covariance;
    demodulating the detection image on the basis of the detected mark; and
    generating output data by decoding the demodulated detection image.

6. The optical information processing method of claim 5, wherein the step of detecting the mark comprises:
    comparing the detection image with a reference image by a covariance, wherein the reference image is an image of over-sampling for the pattern by a covariance; and
    calculating a pixel of the mark over-sampled by values of the reference image and the detection image compared by the covariance.

7. The optical information processing method of claim 6, wherein the step of comparing the detection image with the reference image performs the covariance on the basis of a center pixel of the detection image detected with respect to the over-sampling reference image for the mark.

8. The optical information processing method of claim 6, wherein the value of the reference image and the detection image compared by the covariance is calculated by the following equation:

$$C = \sum_i (x_i - m_x)(y_i - m_y) + \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, and $i=z$ denotes a center pixel of the image of the datapage among the over-sampled pixels of the detection image.

9. The optical information processing method of claim 6, wherein the value of the reference image and the detection image compared by the covariance is calculated by the following equation:

$$C = k_1 \sum_i (x_i - m_x)(y_i - m_y) + k_2 \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, $k_1$ and $k_2$ are real numbers greater than 0 to amplify the calculation values of the reference image and the detection image, and $i=z$ denotes a center pixel of the image of the datapage among the over-sampled pixels of the detection image.

10. An optical information processing apparatus comprising:
    a light source;
    a beam splitter for splitting a beam emitted from the light source into a reference beam and a signal beam;
    a spatial light modulator for loading data into the signal beam;
    an input data processing unit for encoding the data, modulating the encoded data by modulation code conversion to generate a datapage carrying a mark, and providing the generated datapage to the spatial light modulator;
    a detector for over-sampling and detecting the datapage from a reproducing beam reproduced in a recording medium by the reference beam; and
    an output data processing unit for comparing and calculating a mark of the datapage image detected by the detector, and the reference image for the mark, by a covariance, and generating output data by demodulating and decoding the detection image using the mark as a reference position.

11. The optical information processing apparatus of claim 10, wherein the output data processing unit performs the covariance on the basis of a center pixel of the mark in the detection image over-sampled and detected by the detector with respect to the reference image.

12. The optical information processing apparatus of claim 10, wherein the output data processing unit calculates the covariance for the respective pixels of the detection image and the reference image by the following equation:

$$C = \sum_i (x_i - m_x)(y_i - m_y) + \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, and $i=z$ denotes a center pixel of the image of the datapage among the over-sampled pixels of the detection image.

13. The optical information processing apparatus of claim 10, wherein the output data processing unit calculates the covariance of the detection image and the reference image by the following equation:

$$C = k_1 \sum_i (x_i - m_x)(y_i - m_y) + k_2 \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, $k_1$ and $k_2$ are real numbers greater than 0 to amplify the calculation values of the reference image and the detection image, and $i=z$ denotes a center pixel of the image of the datapage among the over-sampled pixels of the detection image.

14. An optical information processing apparatus comprising:
a light source for emitting a beam for reproduction of a datapage;
a detector for over-sampling and detecting the datapage from a reproducing beam reproduced in a recording medium by the beam; and
an output data processing unit for comparing and calculating a mark of the datapage image detected by the detector and the reference image for the mark by a covariance, and generating output data by demodulating and decoding the detection image using the mark as a reference position.

15. The optical information processing apparatus of claim 14, wherein the output data processing unit performs the covariance on the basis of a center pixel of the mark in the detection image over-sampled and detected by the detector with respect to the reference image.

16. The optical information processing apparatus of claim 14, wherein the output data processing unit calculates the covariance for the respective pixels of the detection image and the reference image by the following equation:

$$C = \sum_i (x_i - m_x)(y_i - m_y) + \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $Y_i$, and $i=z$ denotes a center pixel of the image of the datapage among the over-sampled pixels of the detection image.

17. The optical information processing apparatus of claim 14, wherein the output data processing unit calculates the covariance of the detection image and the reference image by the following equation:

$$C = k_1 \sum_i (x_i - m_x)(y_i - m_y) + k_2 \sum_{i=z} (x_i - m_x)(y_i - m_y)$$

where $x_i$ denotes a pixel value of the detection image, $m_x$ denotes a mean value of $x_i$, $y_i$ denotes a pixel value of the reference image, $m_y$ denotes a mean value of $y_i$, $k_1$ and $k_2$ are real numbers greater than 0 to amplify the calculation values of the reference image and the detection image, and $i=z$ denotes a center pixel of the image of the datapage among the over-sampled pixels of the detection image.

* * * * *